US012726251B2

(12) United States Patent
Jaldén et al.

(10) Patent No.: US 12,726,251 B2
(45) Date of Patent: Sep. 1, 2026

(54) INTERFERENCE SUPPRESSION IN A WIRELESS COMMUNICATION NETWORK

(71) Applicant: Telefonaktiebolaget LM Ericsson (publ), Stockholm (SE)

(72) Inventors: Niklas Jaldén, Enköping (SE); Arne Simonsson, Gammelstad (SE); David Astely, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 18/712,103

(22) PCT Filed: Nov. 30, 2021

(86) PCT No.: PCT/SE2021/051189
§ 371 (c)(1),
(2) Date: May 21, 2024

(87) PCT Pub. No.: WO2023/101578
PCT Pub. Date: Jun. 8, 2023

(65) Prior Publication Data

US 2025/0023618 A1 Jan. 16, 2025

(51) Int. Cl.

| | |
|---|---|
| ***H04B 7/06*** | (2006.01) |
| ***H04J 11/00*** | (2006.01) |
| ***H04L 25/02*** | (2006.01) |

(52) U.S. Cl.
CPC ......... *H04B 7/0695* (2013.01); *H04B 7/0632* (2013.01); *H04J 11/0056* (2013.01); *H04L 25/0224* (2013.01)

(58) Field of Classification Search
CPC . H04B 7/0695; H04B 7/0632; H04J 11/0056; H04L 25/0224
See application file for complete search history.

(56) References Cited

U.S. PATENT DOCUMENTS 10,904,708 B1 * 1/2021 Lan ...................... H04W 4/029
2007/0099665 A1 * 5/2007 Kim .................... H04B 1/1027 455/509

(Continued)

FOREIGN PATENT DOCUMENTS

WO 2020160781 A1 8/2020

OTHER PUBLICATIONS

International Search Report and Written Opinion of the International Searching Authority, PCT/SE2021/051189, mailed Sep. 13, 2022, 14 pages.

(Continued)

*Primary Examiner* — Janice N Tieu
(74) *Attorney, Agent, or Firm* — Sage Patent Group

(57) ABSTRACT

There is provided mechanisms for interference suppression in a wireless communication network. A method is performed by a network node. The method includes determining that uplink sounding is to be performed for a first user equipment served by the network node and located at a location. The method includes providing a notification to a neighbor network node and the first user equipment to participate in the uplink sounding of the first user equipment. The method includes determining to perform a downlink transmission towards a seconduser equipment served by the network node and located at the location. The method includes providing an indication for interference suppression at the location to the neighbor network node before performing the downlink transmission.

19 Claims, 8 Drawing Sheets

(56) References Cited

U.S. PATENT DOCUMENTS

| | | | | |
|---|---|---|---|---|
| 2017/0302351 | A1* | 10/2017 | Bi | H04B 7/0413 |
| 2018/0027580 | A1* | 1/2018 | Yoo | H04W 72/046 370/230 |
| 2021/0320693 | A1 | 10/2021 | Stephenne | |
| 2022/0038151 | A1* | 2/2022 | Sengupta | H04B 7/0617 |

OTHER PUBLICATIONS

Samsung, "Interference Measurement Table and Beam Coordination," 3GPP TSG RAN WG1 Meeting NR AH#3, R1-1716039, Nagoya, Japan, Sep. 18-21, 2017.

* cited by examiner (a)

(b)

(c)

INTERFERENCE SUPPRESSION IN A WIRELESS COMMUNICATION NETWORK

CROSS REFERENCE TO RELATED APPLICATIONS

This application is a 35 U.S.C. § 371 national stage application of PCT International Application No. PCT/SE2021/051189 filed on Nov. 30, 2021, the disclosure and content of which is incorporated by reference herein in its entirety.

TECHNICAL FIELD

Embodiments presented herein relate to methods, network nodes, computer programs, and a computer program product for interference suppression in a wireless communication network.

BACKGROUND

In communications networks, there may be a challenge to obtain good performance and capacity for a given communications protocol, its parameters and the physical environment in which the communications network is deployed.

For example, achieving ubiquitous high data rate coverage requires an efficient use of available network resources. One way to achieve high data-rates in wireless communication networks is to use a high number of antennas at both transmitters and receivers. Multiple antenna elements at the transmitter and/or the receiver, makes it possible to exploit spatial degrees of freedom offered by multipath fading of the radio propagation channel between the transmitter and the receiver in order to provide a substantial increase in the data rates and reliability of wireless transmission. In the downlink direction (i.e., from a network node at the network-side towards a user equipment at the user-side), diversity, multiplexing and beamforming techniques can be used to exploit, and take advantage of, the use of multiple antenna elements at the transmitter and/or the receiver. With beamforming, the radiation pattern of the antennas may be controlled by transmitting a signal from a plurality of antenna elements with an element specific gain and phase. In this way, radiation patterns with different pointing directions and beam widths in both elevation and azimuth directions may be created (depending on the structure of the array at which the elements of the antennas are provided).

The gains in performance achieved by adjusting the beam shapes used for transmissions come from both increased receive power (or increased signal to noise ratio; SNR) at the user equipment as well as a possibly lower received interference (or increased signal to interference plus noise ratio; SINR) in a multi-user and/or multi-cell scenario. The optimal precoder to use at the transmitter can be selected according to a tradeoff between maximizing the received power to the intended user equipment whilst minimizing the interference generated to non-intended user equipment. Illustrative examples are provided in FIG. 1 and FIG. 2. At 20 is illustrated the direction to an intended user equipment, whereas at 30 is illustrated the direction to an interfered user. At 10*a* is shown the resulting radiation pattern if the target function when determining the precoder is to only maximize the received power to the intended user. At 10*b* is shown the resulting radiation pattern if the target function when determining the precoder is to optimize a balance of received power over interference generated the radiation pattern. Comparing the radiation patterns 10*a*, 10*b* with respect to interference caused in direction 30 it is clear that radiation pattern 10*b* results in substantially less interference in direction 30 than radiation pattern 10*a* at the cost of slightly lower received power in direction 20.

The overall system capacity can thus be increased by minimizing interference generated to neighboring cells, even if such minimization does not provide any direct benefit to the user equipment in the current cell. In other words, interference mitigation algorithms as used in one cell uses some of its degrees of freedom to sacrifice resources in its own cell to reduce interference in neighboring cells. By using anon-optimal precoder for transmissions, as in FIG. 2, the resource utilization for serving its own users would increase. This is since more resources (e.g., transmission power, time, coding, computational resources, etc.) are needed since the selected precoder is no longer optimal with respect to its own served user equipment. However, if the network nodes of all cells in the wireless communication network behave in the same way, the overall interference is decreased, which reduces the resource utilization by a fraction larger than the increase from using non-optimal precoder, hence resulting in an overall increase in system performance.

To enable interference mitigation as described above, the network nodes of all cells need channel state information, not only for its own served user equipment but also for all user equipment for which interference suppression is to be made. To obtain accurate channel state information with small delay, measurements need to be made over-the-air in the uplink at the network nodes. Each network node should therefore listen to uplink transmissions sent not only by its served user equipment but also to user equipment served by other network nodes. To make this efficient, coordination is required between the different network nodes. Such coordination increases the need for calibration, synchronization, signalling, etc. between the network nodes.

SUMMARY

An object of embodiments herein is to address the above issues, providing efficient interference mitigation without requiring extensive signalling, calibration, and/or synchronization between network nodes of different cells.

According to a first aspect there is presented a method for interference suppression in a wireless communication network. The method is performed by a network node. The method comprises determining that uplink sounding is to be performed for a first user equipment served by the network node and located at a location. The method comprises providing a notification to a neighbor network node and the first user equipment to participate in the uplink sounding of the first user equipment. The method comprises determining to perform a downlink transmission towards a second user equipment served by the network node and located at the location. The method comprises providing an indication for interference suppression at the location to the neighbor network node before performing the downlink transmission.

According to a second aspect there is presented a network node for interference suppression in a wireless communication network. The network node comprises processing circuitry. The processing circuitry is configured to cause the network node to determine that uplink sounding is to be performed for a first user equipment served by the network node and located at a location. The processing circuitry is configured to cause the network node to provide a notification to a neighbor network node and the first user equipment to participate in the uplink sounding of the first user equipment. The processing circuitry is configured to cause the network node to determine to perform a downlink transmission towards a second user equipment served by the network node and located at the location. The processing circuitry is configured to cause the network node to provide an indication for interference suppression at the location to the neighbor network node before performing the downlink transmission.

According to a third aspect there is presented a network node for interference suppression in a wireless communication network. The network node comprises a determine module configured to determine that uplink sounding is to be performed for a first user equipment served by the network node and located at a location. The network node comprises a provide module configured to provide a notification to a neighbor network node and the first user equipment to participate in the uplink sounding of the first user equipment. The network node comprises a determine module configured to determine to perform a downlink transmission towards a second user equipment served by the network node and located at the location. The network node comprises a provide module configured to provide an indication for interference suppression at the location to the neighbor network node before performing the downlink transmission.

According to a fourth aspect there is presented a computer program for interference suppression in a wireless communication network, the computer program comprising computer program code which, when run on processing circuitry of a network node, causes the network node to perform a method according to the first aspect.

According to a fifth aspect there is presented a method for interference suppression in a wireless communication network. The method is performed by a network node. The method comprises obtaining a notification from a neighbor network node to participate in uplink sounding of a user equipment served by the neighbor network node. The method comprises populating a database with spatial channel characteristics. The spatial channel characteristics are determined from measurements on an uplink reference signal received by the network node from the user equipment as part of the uplink sounding. The spatial channel characteristics represent radio conditions for a location at which the user equipment is located when transmitting the uplink reference signal. The method comprises obtaining, from the neighbor network node, an indication for interference suppression at the location. The method comprises retrieving, from the database, the spatial channel characteristics for the location and as populated in the database by the network node. The method comprises applying a precoder determined based on the spatial channel characteristics when performing a downlink transmission for interference suppression towards the location.

According to a sixth aspect there is presented a network node for interference suppression in a wireless communication network. The network node comprises processing circuitry. The processing circuitry is configured to cause the network node to obtain a notification from a neighbor network node to participate in uplink sounding of a user equipment served by the neighbor network node. The processing circuitry is configured to cause the network node to populate a database with spatial channel characteristics. The spatial channel characteristics are determined from measurements on an uplink reference signal received by the network node from the user equipment as part of the uplink sounding. The spatial channel characteristics represent radio conditions for a location at which the user equipment is located when transmitting the uplink reference signal. The processing circuitry is configured to cause the network node to obtain, from the neighbor network node, an indication for interference suppression at the location. The processing circuitry is configured to cause the network node to retrieve, from the database, the spatial channel characteristics for the location and as populated in the database by the network node. The processing circuitry is configured to cause the network node to apply a precoder determined based on the spatial channel characteristics when performing a downlink transmission for interference suppression towards the location.

According to a seventh aspect there is presented a network node for interference suppression in a wireless communication network. The network node comprises an obtain module configured to obtain a notification from a neighbor network node to participate in uplink sounding of a user equipment served by the neighbor network node. The network node comprises a populate module configured to populate a database with spatial channel characteristics. The spatial channel characteristics are determined from measurements on an uplink reference signal received by the network node from the user equipment as part of the uplink sounding. The spatial channel characteristics represent radio conditions for a location at which the user equipment is located when transmitting the uplink reference signal. The network node comprises an obtain module configured to obtain, from the neighbor network node, an indication for interference suppression at the location. The network node comprises a retrieve module configured to retrieve, from the database, the spatial channel characteristics for the location and as populated in the database by the network node. The network node comprises an apply module configured to apply a precoder determined based on the spatial channel characteristics when performing a downlink transmission for interference suppression towards the location.

According to an eighth aspect there is presented a computer program for interference suppression in a wireless communication network, the computer program comprising computer program code which, when run on processing circuitry of a network node, causes the network node to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these aspects provide efficient interference suppression in a wireless communication network.

Advantageously, these aspects enable intercell interference mitigation.

Advantageously, these aspects enable uplink sounding to be performed for interference suppression purposes only when needed, thereby reducing the overall complexity for performing the interference suppression.

Advantageously, these aspects are not limited by available uplink reference signal resources for uplink sounding when interference mitigation is needed.

Advantageously, these aspects require only moderate signalling between the network nodes.

Advantageously, these aspects can be performed during low network loads, allowing improved SINR for interference characteristics estimation. This in turn provides higher quality interference statistics (e.g., long term averaging, thus improving the SNR).

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise.

The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 3:
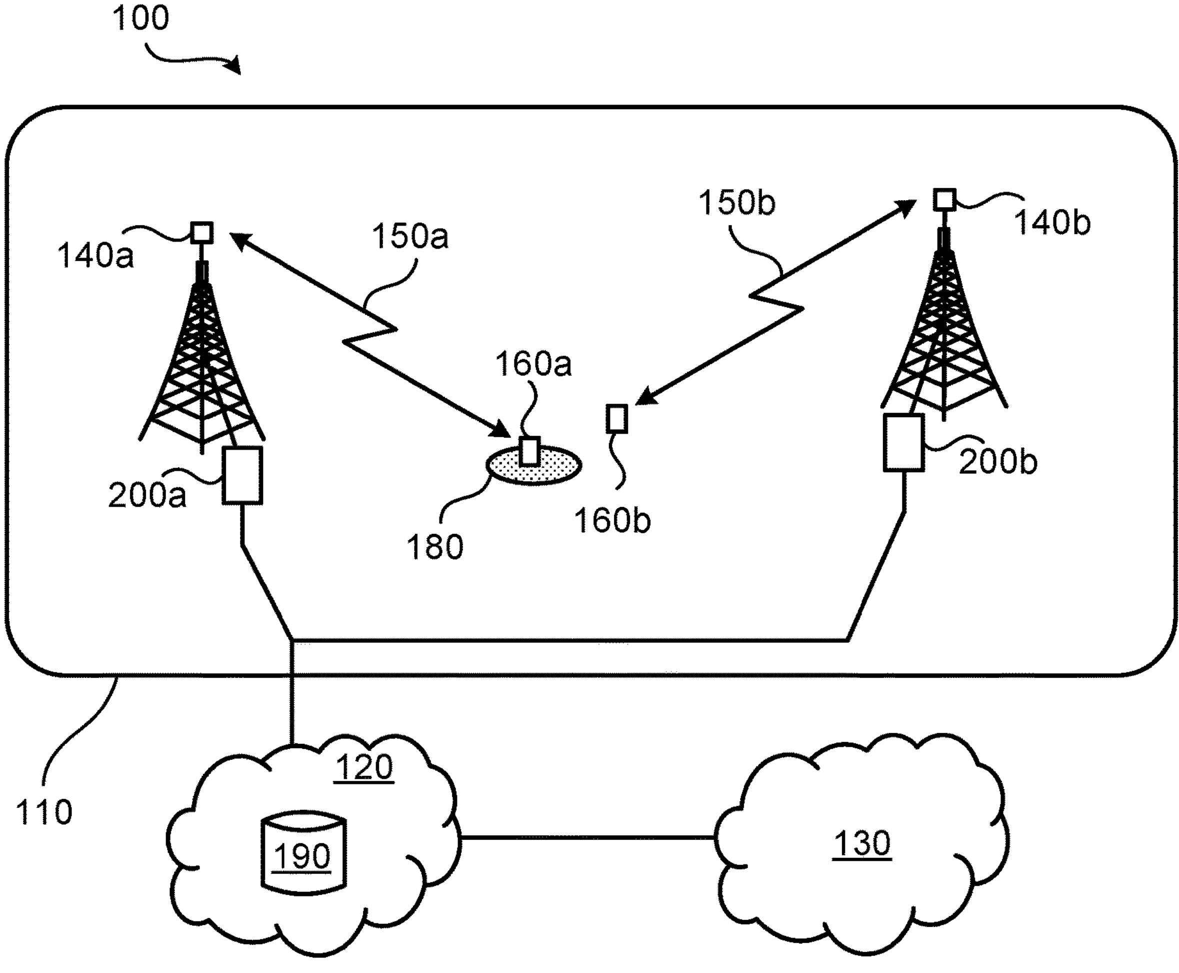
FIGS. 3 and 6 are schematic diagrams illustrating a wireless communication network according to embodiments.

FIG. 3 is a schematic diagram illustrating an example wireless communication network 100 where embodiments presented herein can be applied. The wireless communication network 100 could be a third generation (3G) telecommunications network, a fourth generation (4G) telecommunications network, a fifth generation (5G) telecommunications network, or any evolvement thereof, and support any 3GPP telecommunications standard, where applicable. The wireless communication network 100 could alternatively be a non-cellular and/or a non-3GPP network, such as an IEEE 802.11 communications network, or any other wireless IEEE compliant communications network. The wireless communication network 100 comprises network nodes 200*a*, 200*b* provided in a (radio) access network 110. Network nodes 200*a*, 200*b* are configured to, via respective transmission and reception points (TRPs) 140*a*, 140*b*, provide network access to user equipment 160*a*, 160*b* over wireless links 150*a*, 150*b*. The location of user equipment 160*a* is schematically illustrated at reference numeral 180. The (radio) access network 110 is operatively connected to a core network 120. The core network 120 comprises a database 190. Further details of the database 190 will be provided below. The core network 120 is in turn operatively connected to a service network 130, such as the Internet. The user equipment 160*a*, 160*b* are thereby enabled to, via the network nodes 200*a*, 200*b* and the TRPs 140*a*, 140*b*, access services of, and exchange data with, the service network 130. Examples of network nodes 200*a*, 200*b* are radio access network nodes, radio base stations, base transceiver stations, Node Bs, evolved Node Bs, gNBs, access points, and integrated access and backhaul nodes. Examples of user equipment 160*a*, 160*b* are wireless devices, mobile stations, mobile phones, handsets, wireless local loop phones, smartphones, laptop computers, tablet computers, network equipped sensors, network equipped vehicles, and so-called Internet of Things devices.

In at least some of the embodiments disclosed hereinafter, with respect to user equipment 160*a*, network node 200*a* will represent a serving network node and network node 200*b* will represent a neighbour network node (being a potential interferer or aggressor with respect to user equipment 160*a*). Likewise, with respect to user equipment 160*b*, network node 200*b* will represent a serving network node and network node 200*a* will represent a neighbour network node (being a potential interferer or aggressor with respect to user equipment 160*b*).

If using explicit channel estimation for obtaining channel state information of user equipment served by other network nodes to limit interference in downlink transmissions, a network node needs an over-dimensioning of computational resources to cope with estimation of the radio propagation channels to all user equipment intended being served, as well as for all user equipment (served by a neighbour network node) for which interference is to be suppressed. This would lead to high complexity, costly hardware and possible high energy consumption.

In addition, transmission of uplink reference signals, such as sounding reference signals (SRS) uses radio resources that otherwise could be used for uplink data transmission, resulting in the uplink capacity being reduced. Uplink symbols available for user data are reduced and the transmission causes uplink interference.

The largest gain of acquiring channel state information (CSI) based on uplink reference signals over channel estimation based on codebook reports is with reciprocity based beamforming which performs best in good radio conditions. With this in mind, uplink reference signals should only be scheduled for, or allocated to, user equipment 160*a*, 160*b* in favorable channel conditions, These user equipment commonly correspond to the user equipment being physically located closest to the serving TRP, whereas user equipment closer to the cell edge are configured to provide channel feedback in terms of codebook reports. Hence, no interference suppression can be performed for the user equipment that would need it the most.

Further, since SRS resources are a non-infinite resource, network nodes of TRPs serving neighboring cells need to share the SRS resources to allow for channel estimation of user equipment in other cells. This further decreases the number of usable SRS resources even further. Since interference mitigation is most needed when the cell load is high, it is likely that there is already a shortage of SRS resources when they are useful for interference mitigation purposes.

Thus, there is a need for enhanced interference suppression, disregarding if direct or indirect channel estimation is considered.

The embodiments disclosed herein thus relate to mechanisms for interference suppression in a wireless communication network 100. In order to obtain such mechanisms there is provided a network node 200*a*, a method performed by network node 200*a*, a computer program product comprising code, for example in the form of a computer program, that when run on processing circuitry of network node 200*a*, causes network node 200*a* to perform the method. In order to obtain such mechanisms there is further provided a network node 200*b*, a method performed by network node 200*b*, and a computer program product comprising code, for example in the form of a computer program, that when run on processing circuitry of network node 200*b*, causes network node 200*b* to perform the method.

Figure 4:
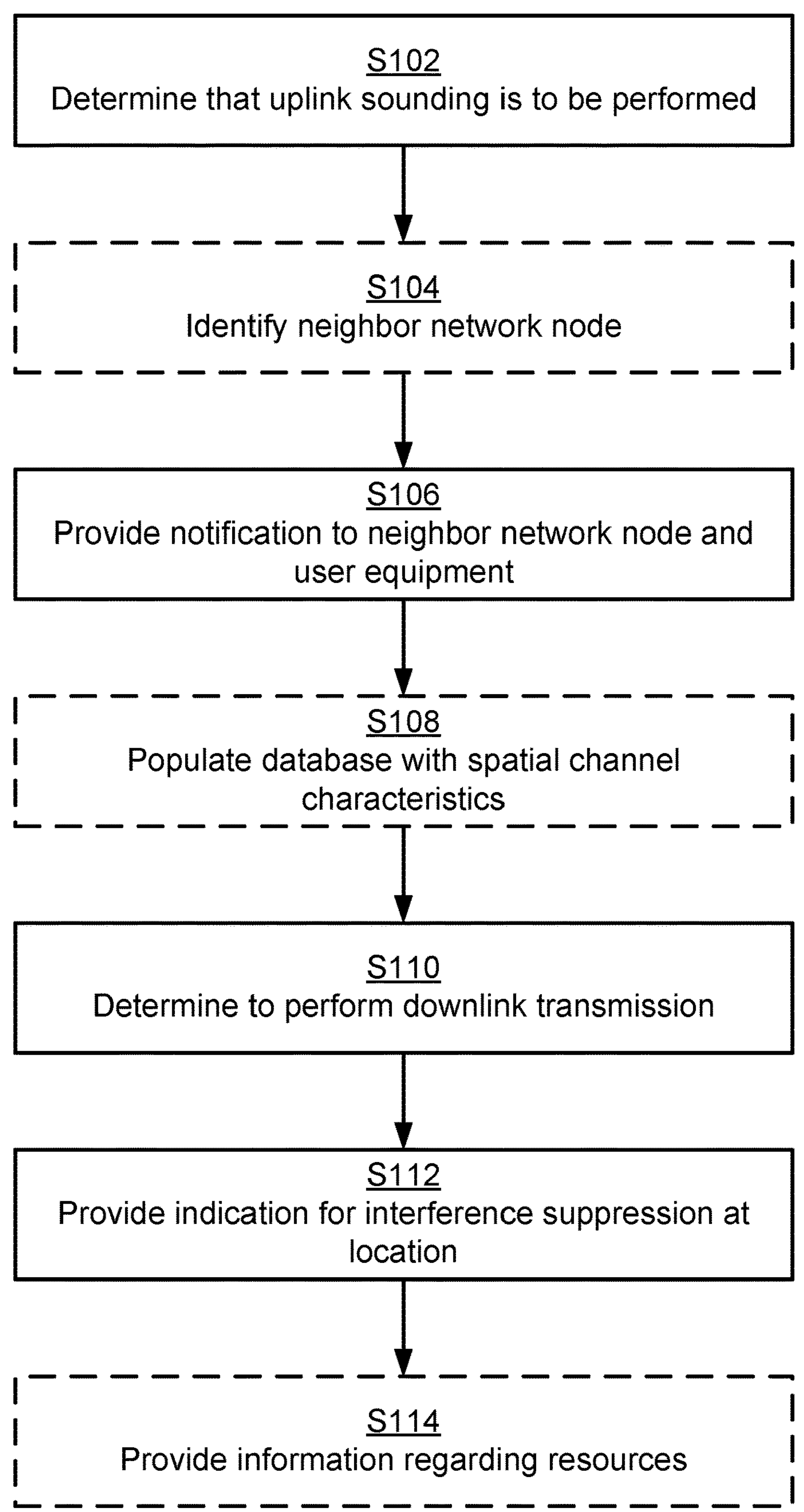
FIGS. 4, 5, and 7 are flowcharts of methods according to embodiments.

Reference is now made to FIG. 4 illustrating a method for interference suppression in a wireless communication network 100 as performed by network node 200*a* according to an embodiment.

S102: Network node 200*a* determines that uplink sounding is to be performed for a first user equipment 160*a* served by network node 200*a* and located at a location 180.

S106: Network node 200*a* provides a notification to network node 200*b* and the first user equipment 160*a* to participate in the uplink sounding of the first user equipment 160*a*. In this respect, separate notifications are provided; one for network node 200*b* and one for the first user equipment 160*a*. Information that specifies the location 180 might be provided by network node 200*a* to network node 200*b* in S106 or at the latest in conjunction with S112.

S110: Network node 200*a* determines to perform a downlink transmission towards a second user equipment 160*a* served by network node 200*a* and located at the location 180. It is here noted that the first user equipment 160*a* and the second user equipment 160*a* are either different from each other or are one and the same user equipment 160*a*. For example, when the second user equipment 160*a* and the first user equipment 160*a* are one and the same user equipment this implies that the first user equipment 160*a* has returned to the location 180 at a later point in time. For example, when the second user equipment 160*a* and the first user equipment 160*a* are not one and the same user equipment this implies that the first user equipment 160*a* does not return to the location 180 at a later point in time.

S112: Network node 200*a* provides an indication for interference suppression at the location 180 to network node 200*b* before performing the downlink transmission.

In this respect, the indication in S112 can by network node 200*a* be provided to network node 200*b* either when the downlink transmission is initiated or just before the downlink transmission is started so that network node 200*b* is capable of timely performing the interference suppression at the location 180 (i.e., so as to suppress its interference towards the location 180 at the time the downlink transmission from network node 200*a* reaches the second user equipment 160*a*).

Embodiments relating to further details of interference suppression in a wireless communication network 100 as performed by network node 200*a* will now be disclosed.

In some aspects, uplink sounding is only performed for locations sensitive to interference. There could be different examples of such locations 180. In some embodiments, the location 180 corresponds to a cell edge of network node 200*a*. In some embodiments, the location 180 has been identified as impacted by interference. Such identification can be based on historical measurements, information of network topology, information of transmission patterns used by neighbor network nodes 200*b*, etc.

There could be different ways in which the location 180 is specified, defined, or represented. In some embodiments, the location 180 is represented by either a direction value and a distance value, or a set of coordinates, or an index. The location 180 might be identified by means of location information form higher order protocols such as for example application data with the location of user equipment 160*a* from a space-based radio-navigation system, such as a Global Navigation Satellite System (GNSS). The location 180 might be identified by means of analysis of previous channel information, such as uplink sounding showing direction of arrival and time/delay information. The location 180 might be identified by means of triangularization based on network signaling. The location 180 might be identified by means of codebook-based reports from the user equipment 160*a*, such as a precoding matrix index (PMI) indicating direction of arrival and channel quality indicator (CQI) indicating distance between the TRP of the serving network node and the user equipment. The location 180 might be identified by means of handover or radio resource control (RRC) measurement reports showing the radio relation to potential interfering neighbor network nodes. The location 180 might be identified by means of an index in a table of countable number of locations in a cell. The countable number of locations could be defined by dividing the cell into a grid of locations. This table is then assumed to be known to both network node 200*a* and network node 200*b*. Any of the above disclosed methods can be used to first identify the location 180. Network node 200*a* could then, for example, map a direction value and a distance value (or similar) to the index in the table that best matches (according to some distance metric) the determined direction value and distance value. Further, the location 180 might either be specified in absolute terms or in relative terms. The latter enables each network node 200*a*, 200*b* to keep its own reference system with respect to locations. For example, it might be assumed that any pair of network nodes only have very limited regions of overlapping network coverage compared to the whole network coverage of each individual network node. For example, network node 200*b* does not need to keep track of those locations in which network node 200*a* provides network coverage but where network node 200*a* does not cause any interference.

As disclosed above, separate notifications are provided in step S106; one for network node 200*b* and one for the first user equipment 160*a*. In this respect, network node 200*a* might explicitly instruct the first user equipment 160*a* to transmit the uplink reference signals. That is, in some embodiments, the notification provided to the first user equipment 160*a* comprises instructions for the first user equipment 160*a* to transmit uplink reference signals as part of participating in the uplink sounding of the first user equipment 160*a*. Further, the instructions might identify uplink reference signal resources for the first user equipment 160*a* to use when transmitting the uplink reference signals.

There could be different ways for network node 200*a* to determine the uplink reference signal resources. In some aspects, the uplink reference signal resources are determined based on knowledge of network topology, information of transmission patterns used by neighbor network nodes 200*b*, etc. In some aspects, the decision regarding which uplink reference signal resources to used is coordinated between network node 200*a* and network node 200*b*. That is, in some embodiments, which uplink reference signal resources for the first user equipment 160$a$ to use is coordinately determined with network node 200$b$. For example, the uplink reference signal resources might be selected so as to not coincide with uplink transmissions from user equipment 160$b$ served by network node 200$b$.

In some aspects, when to perform the uplink sounding is determined based on traffic patterns in the wireless communication network 100. This enables the uplink sounding to have as little impact as possible on the throughput of the wireless communication network 100. Particularly, in some embodiments, the uplink sounding is performed only when a traffic load of network node 200$a$ is below a traffic load threshold value and/or during a predetermined time interval. Hence, the uplink sounding might be performed during low traffic scenarios such as is expected during nighttime, etc.

In some aspects, whether or not to perform the uplink sounding is determined based on the location 180 itself. In this respect, the training phase might be initiated when a user equipment requesting data is detected to be at a location for which spatial channel characteristics are missing or at locations for which existing spatial channel characteristics are outdated or where there are too few (according to some measurement criterion) measurements of spatial channel characteristics. Particularly, in some embodiments, the uplink sounding is performed only when at most a predetermined amount of previous uplink sounding has been performed for the location 180 or when at least a predetermined amount of time has passed since a recent-most previous uplink sounding for the location 180 was performed. The uplink sounding might thereby be performed only for locations 180 for which spatial channel characteristics are missing, or outdated, or represented by too few measurements, in the database 190. Outdated spatial channel characteristics might be indicated by reports that the interference suppression is not sufficient (e.g., too high interference is experienced in previous transmissions).

In some aspects, network node 200$a$ explicitly identifies that network node 200$b$ is potential interferer, or aggressor. Hence, in some embodiments, network node 200$a$ is configured to perform (optional) step S104:

S104: Network node 200$a$ identifies network node 200$b$ as a candidate for causing interference at the location 180 before providing the notification to network node 200$b$.

Step S104 might be performed when network node 200$b$ is non-static and movable between different locations dependent (and thus has a time-dependent deployment in the wireless communication network 100).

Aspects of how network node 200$a$ might identify network node 200$b$ as a candidate for causing interference at the location 180 will be disclosed next.

In some non-limiting examples, network node 200$b$ is identified based on at least one of: historical information regarding previously caused interference at the location 180 (for example that a certain set of network nodes 200$b$ are always potential interferers), a measurement report from the first user equipment 160$a$, distance information regarding physical distance between network node 200$a$ and network node 200$b$, network topology information. In some examples the measurement report is an RRC report indicating that transmissions from non-serving network nodes 200$b$ can be received at a received power value being higher than some predetermined threshold value. In some examples the measurement report is a handover measurement report revealing that the user equipment is on a cell edge. In some examples the measurement report comprises a CQI or reference signal received power (RSRP) that indicates a low SINR despite network node 200$a$ using a relatively high signal strength.

As will be disclosed below with reference to FIG. 5, network node 200$b$ populates a database 190 with spatial channel characteristics. The spatial channel characteristics are determined from measurements on an uplink reference signal received by network node 200$b$ from the user equipment 160$a$ as part of the uplink sounding. In some aspects, also network node 200$a$ populates the database 190. Hence, in some embodiments, network node 200$a$ participates in the uplink sounding of the user equipment 160$a$, and is configured to perform (optional) step S108:

S108: Network node 200$a$ populates a database 190 with spatial channel characteristics. The spatial channel characteristics are determined from measurements on an uplink reference signal received by network node 200$a$ from the first user equipment 160$a$ as part of the uplink sounding. The spatial channel characteristics represent radio conditions for the location 180 at which the first user equipment 160$a$ is located when transmitting the uplink reference signal.

There could be different examples of how to collect the spatial channel characteristics. In some embodiments, the spatial channel characteristics is represented by covariance information. The covariance information generally represents the cross-correlation values of the channel estimates for any pair of two antennas (at the receiver side) obtained during the uplink sounding. This covariance information could be provided in a matrix as E $[H^*\cdot H]$, where E[ ] denotes the expectation operator, where His a channel matrix obtained from the uplink sounding, where $H^*$ is the conjugate transpose of H and where $H^*\cdot H$ is the matrix multiplication between $H^*$ and H, and where H is of dimension $N_{UE}$ times $N_{NN}$ where $N_{UE}$ is the number of antennas at the user equipment and $N_{NN}$ is the number of antennas at each network node. In some embodiments, the covariance information is frequency dependent. For example, the covariance information might be constructed as frequency dependent, where each interfered user equipment 160$a$ is only contributing to the spatial channel characteristics for the resource blocks for which is it scheduled in the DL by serving network node 20$a$. This allows higher freedom and less impact of the interference mitigation when using a wideband covariance matrix.

In some aspects, the indication for interference suppression at the location 180 is in step S112 provided to network node 200$b$ upon network node 200$a$ having identified a need for interference suppression at the location 180. In particular, in some embodiments, the indication for interference suppression is provided in response to network node 200$a$ having determined that the second user equipment 160$a$ is located at the location 180. In further examples, the need for interference suppression at the location 180 is identified based on the load in the cell served by network node 200$a$, from information of the average load in the wireless communication network 100 (either as whole or only by network node 200$a$ and its neighbor network nodes 200$b$), and/or from reports from served user equipment 160$a$ indicating potentially poor SINR.

In some aspects, network node 200$a$ provides information to network node 200$b$ of which resources are to be used for DL data transmission to the second user equipment 160$a$. Particularly, in some embodiments, network node 200$a$ is configured to perform (optional) step S114:

S114: Network node 200$a$ provides information to network node 200$b$ regarding time, frequency, and/or code, resources to be used by network node 200$a$ when performing the downlink transmission. In this respect, the information could pertain to either one single location where interference suppression is needed or to at least two locations where interference suppression is needed. Hence, in general terms, in some embodiments, there are more than one location where interference suppression is needed that are indicated in S112.

Figure 5:
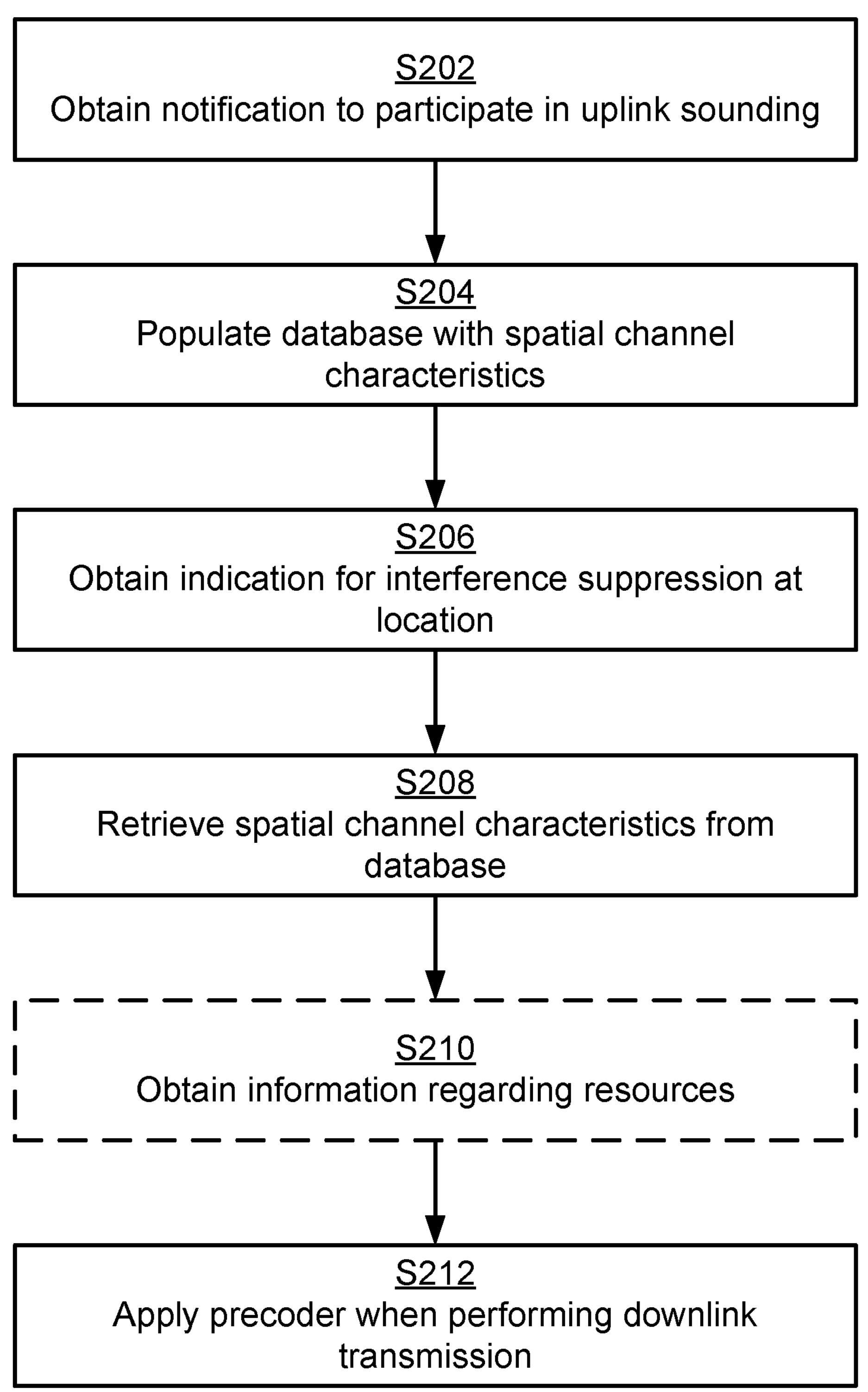

Reference is now made to FIG. 5 illustrating a method for interference suppression in a wireless communication network 100 as performed by network node 200*b* according to an embodiment.

S202: Network node 200*b* obtains a notification from network node 200*a* to participate in uplink sounding of a user equipment 160*a* served by network node 200*a*.

S204: Network node 200*b* populates a database 190 with spatial channel characteristics. The spatial channel characteristics are determined from measurements on an uplink reference signal received by network node 200*b* from the user equipment 160*a* as part of the uplink sounding. The spatial channel characteristics represent radio conditions for a location 180 at which the user equipment 160*a* is located when transmitting the uplink reference signal. Information that specifies the location 180 might be obtained by network node 200*b* from network node 200*b* in S102 or at the latest in conjunction with S206. If not obtained until in conjunction with S206, network node 200*b* might store the spatial channel characteristic at an intermediate place in the database 190 until the location 180 is known.

S206: Network node 200*b* obtains, from network node 200*a*, an indication for interference suppression at the location 180.

S208: Network node 200*b* retrieves, from the database 190, the spatial channel characteristics for the location 180 and as populated in the database 190 by network node 200*b*.

S212: Network node 200*b* applies a precoder. The precoder is determined based on the spatial channel characteristics when performing a downlink transmission for interference suppression towards the location 180.

Embodiments relating to further details of interference suppression in a wireless communication network 100 as performed by network node 200*b* will now be disclosed. In general terms, all embodiments, aspects, and examples, as disclosed above with reference to network node 200*a* also apply for network node 200*b*

As disclosed above, in some embodiments, the spatial channel characteristics is represented by covariance information.

As disclosed above, in some embodiments, the covariance information is frequency dependent.

As disclosed above, in some embodiments, the location 180 is represented by either a direction value and a distance value, or a set of coordinates, or an index.

As disclosed above, in some aspects, network node 200*a* provides information to network node 200*b* of which resources are to be used for DL data transmission to the second user equipment 160*a*. Therefore, in some embodiments, network node 200*b* is configured to perform (optional) step S210:

S210: Network node 200*b* obtains information from network node 200*a* regarding time, frequency, and/or code, resources to be used by network node 200*a* when network node 200*b* is to perform interference suppression at the location 180. The precoder further is based on the information regarding the time, frequency, and/or code, resources.

As disclosed above, in general terms, in some embodiments, there are more than one location where interference suppression is needed that are indicated in S112 and hence obtained by network node 200*b* in S206.

Further aspects of how network node 200*b* might determine the precoder will be disclosed next. In some embodiments, the precoder is determined based on further spatial channel characteristics for at least one further location 180 for which interference suppression has been indicated. This might be the case when the channel covariance information is based on summing multiple entries from the database 190, allowing interference suppression to simultaneously in time be performed for multiple user equipment and/or locations.

Figure 6:
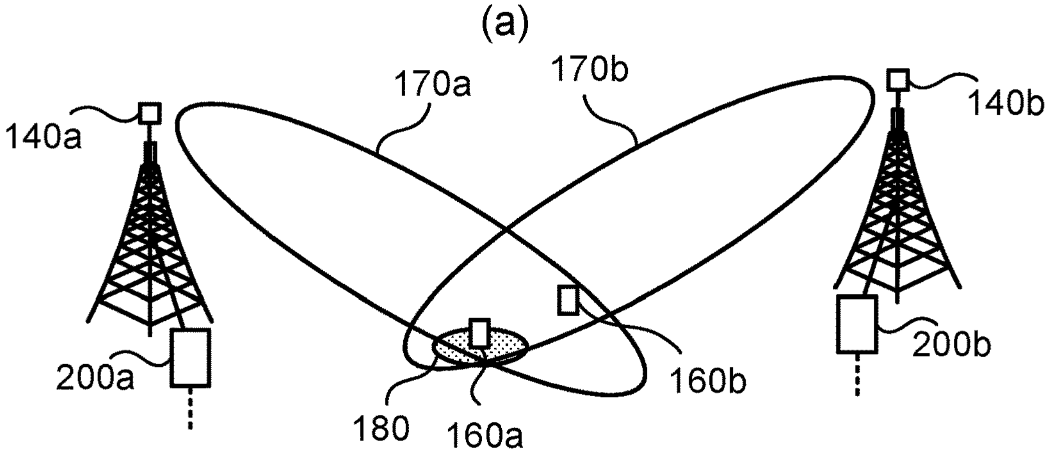
Figure 6:
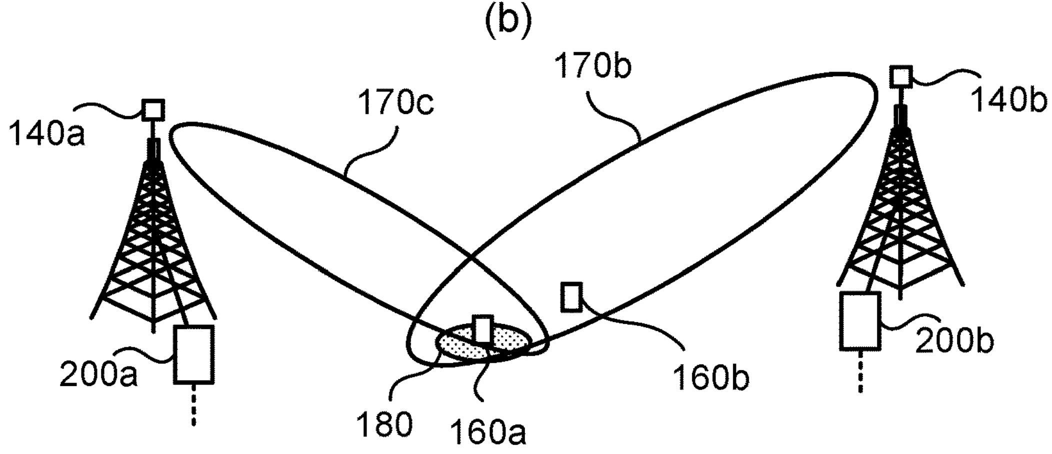
Figure 6:
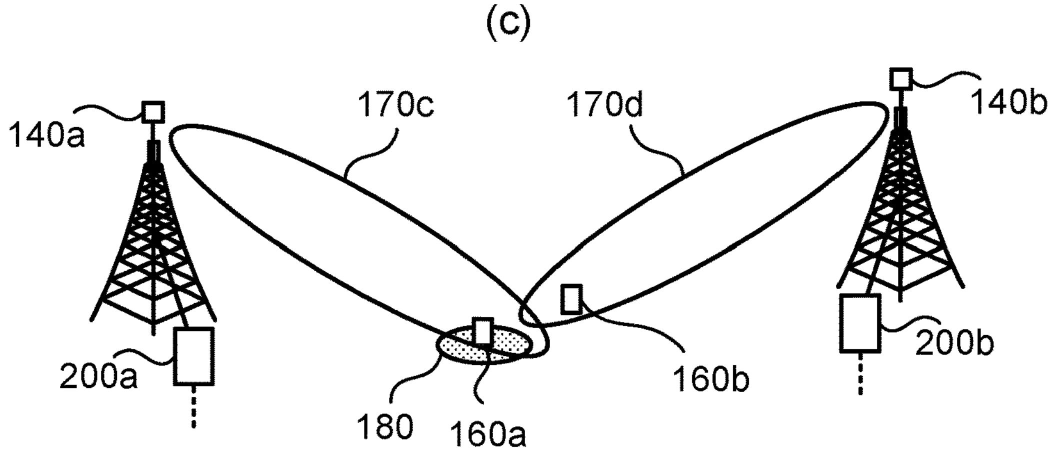

Reference is next made to FIG. 6 which at (a), (b), and (c) disclose different phases in time of operation in the wireless communication network of FIG. 3 but where illustration of some of the entities in FIG. 3 has been omitted.

Figure 1:
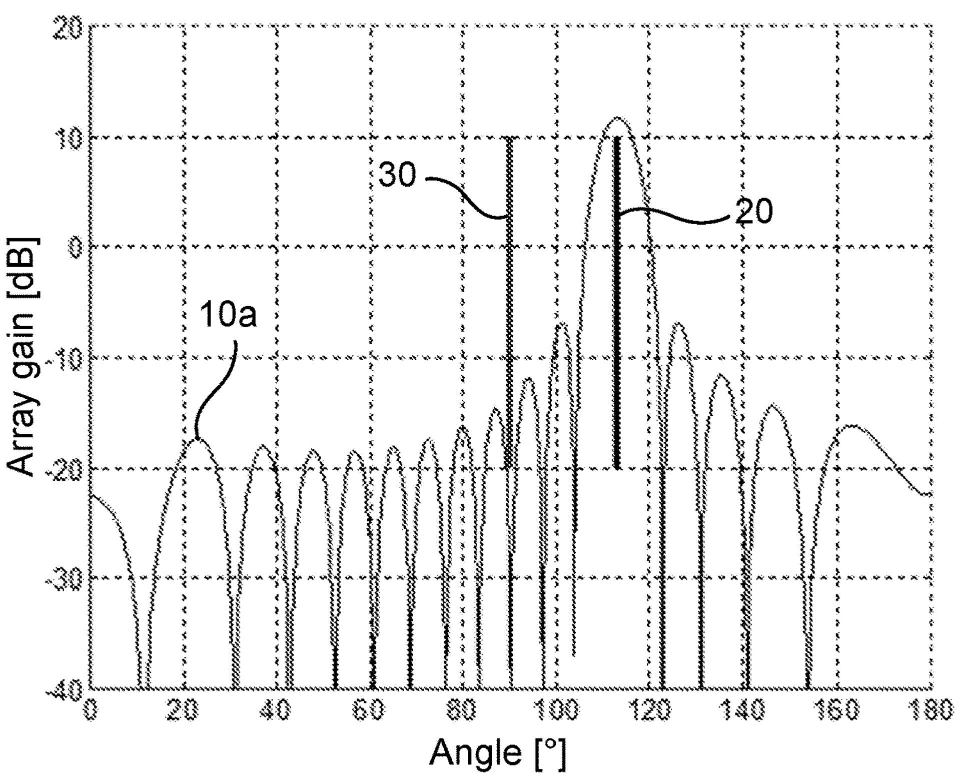
FIGS. 1 and 2 show radiation patterns according to examples.
Figure 2:
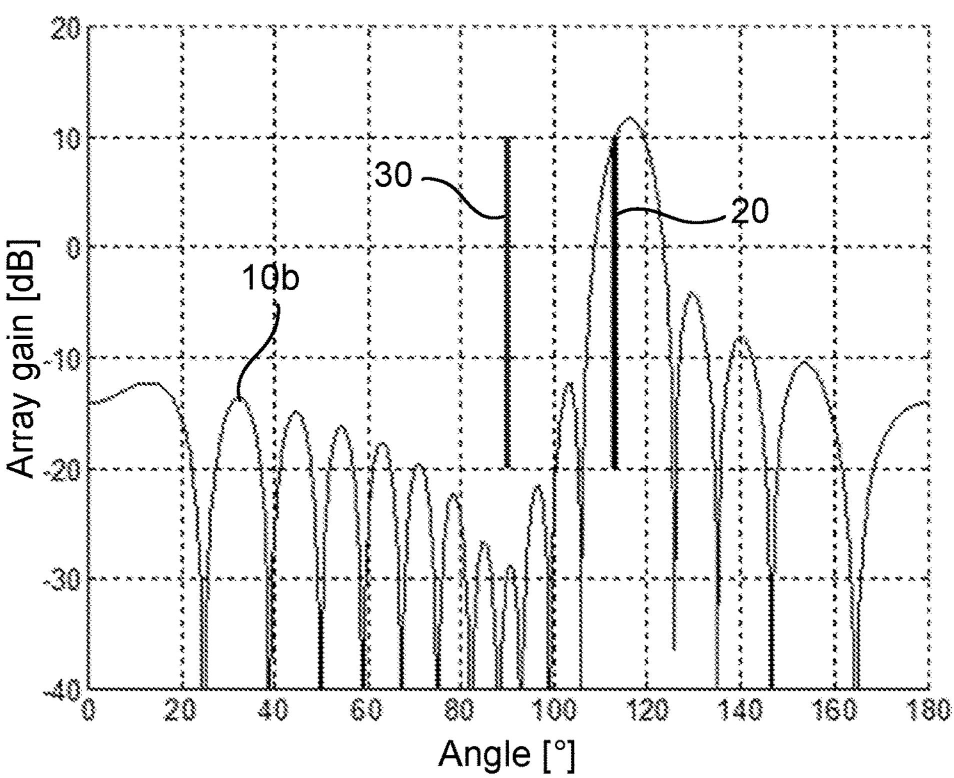

In FIG. 6 (*a*) is illustrated that network node 200*a*, via TRP 140*a*, serves user equipment 160*a* in a radiation pattern represented by beam 170*a* and that network node 200*b*, via TRP 140*b*, serves user equipment 160*b* in a radiation pattern represented by beam 170*b*. The location of user equipment 160*a* is schematically illustrated at reference numeral 180. As can be seen in the figure, beam 170*a* causes interference to user equipment 160*b* and beam 170*b* causes interference to user equipment 160*a*. From the perspective of both network node 200*a* and network node 200*b*, this corresponds to the radiation pattern in FIG. 1. In FIG. 6 (*b*) network node 200*a* has applied an interference suppression based precoder, resulting in a radiation pattern represented by beam 170*c*. In order to do so, network node 200*a* has thus followed the steps disclosed in FIG. 5 and network node 200*b* has thus followed the steps disclosed in FIG. 4. As can be seen in FIG. 6 (*b*), beam 170*c* does not cause any interference to user equipment 160*b* but does not reduce the performance for user equipment 160*a*. From the perspective of network node 200*a* this corresponds to the radiation pattern in FIG. 2 whereas it from the perspective of network node 200*b* still corresponds to the radiation pattern in FIG. 1. In FIG. 6 (*c*) also network node 200*b* has applied an interference suppression based precoder, resulting in a radiation pattern represented by beam 170*d*. In order to do so, network node 200*a* has thus followed the steps disclosed in FIG. 4 and network node 200*b* has thus followed the steps disclosed in FIG. 5. As can be seen in FIG. 6 (*c*), beam 170*d* does not cause any interference to user equipment 160*a* but does not reduce the performance for user equipment 160*b*. From the perspective of both network node 200*a* and network node 200*b*, this corresponds to the radiation pattern in FIG. 2.

Figure 7:
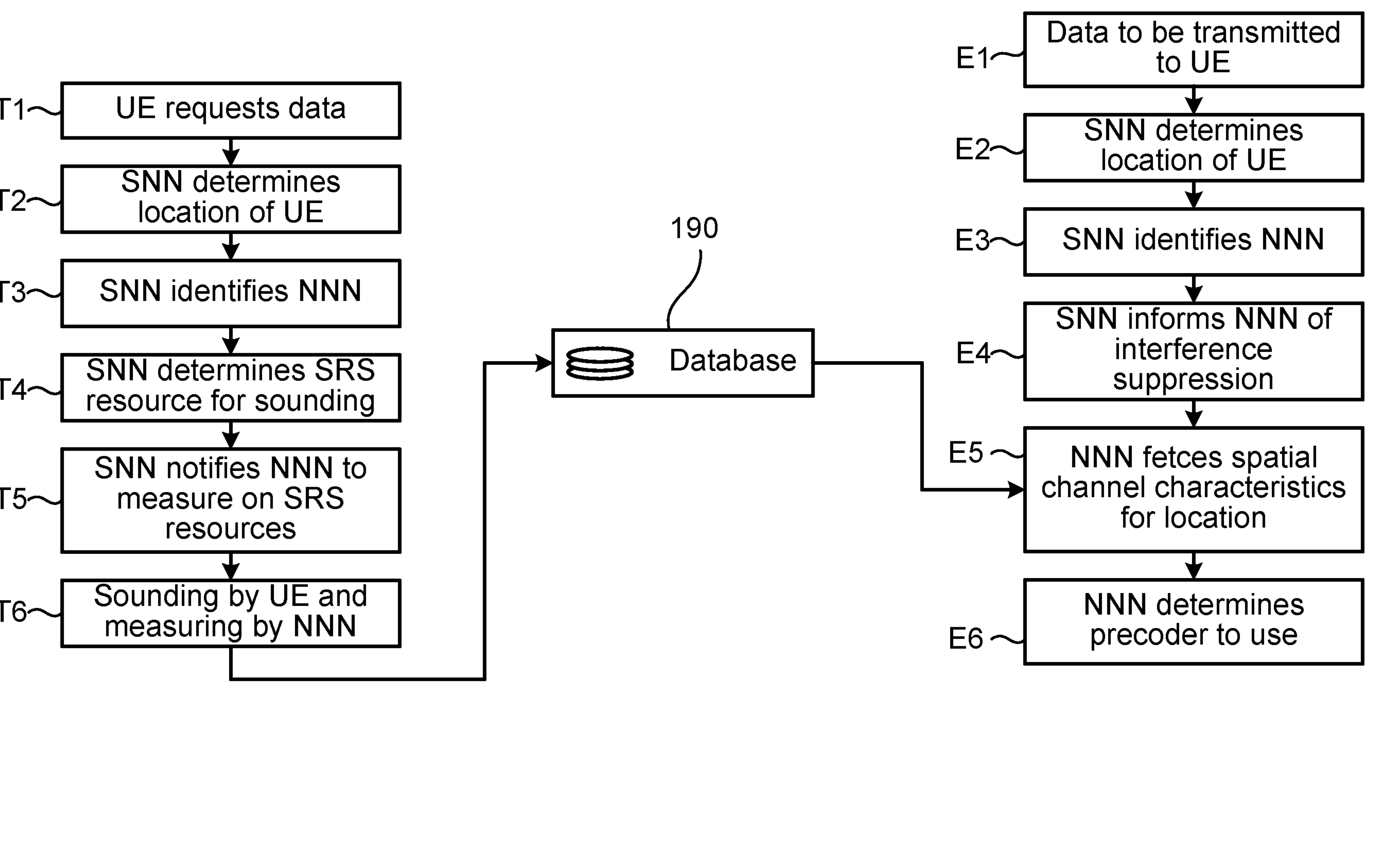

One particular embodiment for interference suppression in a wireless communication network 100 as performed by network node 200*a* and network node 200*b* based on at least some of the above disclosed embodiments will now be disclosed in detail with reference to the flowchart of FIG. 7.

The embodiment is for illustrative purposes split into two phases; a training phase and an execution phase. It is noted that both phases could run in parallel and signaling in either of them could be used in the other, but for sake of simplicity and illustration they are herein separately described. It is further noted that although the same user equipment 160*a* and the same location 180 is referred to in both the training phase and the execution phase, but generally one instance of the training phase is to be performed for one given user equipment and location. Hence, multiple instances of the training phase could be performed, each for a respective user equipment and location in order to populate database 190 with spatial channel characteristics for different locations 180. It is here only assumed that the database 190 has been populated by network node 200_b_ with spatial channel characteristics as valid for the location 180 before the execution phase is started.

Steps of the training phase will be disclosed next.

T1: User equipment (UE) 160_a_ requests DL data from serving network node 200_a_.

T2: Serving network node (SNN) 200_a_ determines the location 180 of user equipment 160_a_, as disclosed above.

T3: Serving network node 200_a_ identifies neighbor network node (NNN) 200_b_ as a potential interferer or aggressor. Identification of network node 200_b_ could be performed in several different ways, as disclosed above.

T4: Serving network node 200_a_ determines appropriate uplink reference signal resources for user equipment 160_a_ to use and informs user equipment 160_a_ of the uplink reference signal resources.

T5: Serving network node 200_a_ notifies network node 200_b_ to measure on the uplink reference signal allocated for user equipment 160_a_ and notifies network node 200_b_ about the location 180 of user equipment 160_a_.

T6: User equipment 160_a_ performs sounding by transmitting the uplink reference signal according to the uplink reference signal resources. Network node 200_b_ measures on the uplink reference signals to generate information of the spatial channel characteristics for the user equipment 160_a_ at the location 180 and stores the spatial channel characteristics for the location 180 in database 190.

Steps of the execution phase will be disclosed next.

E1: There is data in a downlink buffer at serving network node 200_a_ to be transmitted towards user equipment 160_a_, or user equipment 160_a_ is requesting data from serving network node 200_a_.

E2: Serving network node 200_a_ determines the location 180 of user equipment 160_a_, for example in the same way as in step T2.

E3: Serving network node 200_a_ identifies a need for interference suppression for the transmission of data towards user equipment 160_a_ and identifies network node 200_b_ as a potential interferer or aggressor.

E4: Serving network node 200_a_ informs network node 200_b_ that interference suppression is to be applied in following transmission occasions (on resources allocated for user equipment 160_a_) at the location 180.

E5: Network node 200_b_ fetches the spatial channel characteristics for the given location 180.

E6: Network node 200_b_ uses the thus fetched spatial channel characteristics together with other channel information for determining a precoder to use during the transmission occasions specified by serving network node 200_a_.

It is understood that only one single network node 200_b_ has been considered for illustrative purposes and that the herein disclosed embodiments apply to wireless communication networks 100 where serving network node 200_a_ has two or more neighbor network nodes 200_b_, each performing the steps of the single network node 200_b_.

Figure 8:
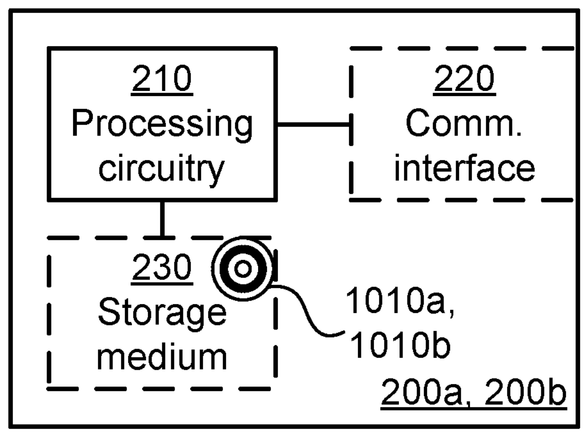
FIG. 8 is a schematic diagram showing functional units of a network node according to an embodiment.

FIG. 8 schematically illustrates, in terms of a number of functional units, the components of network node 200_a_, 200_b_ according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010_a_ (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause network node 200_a_, 200_b_ to perform a set of operations, or steps, as disclosed above. For example, the storage medium 230 may store the set of operations, and the processing circuitry 210 may be configured to retrieve the set of operations from the storage medium 230 to cause network node 200_a_, 200_b_ to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

Network node 200_a_, 200_b_ may further comprise a communications interface 220 for communications with other entities, functions, nodes, and devices, provided in the wireless communication network 100 or operatively connected to the wireless communication network 100. As such the communications interface 220 may comprise one or more transmitters and receivers, comprising analogue and digital components.

The processing circuitry 210 controls the general operation of network node 200_a_, 200_b_ e.g. by sending data and control signals to the communications interface 220 and the storage medium 230, by receiving data and reports from the communications interface 220, and by retrieving data and instructions from the storage medium 230. Other components, as well as the related functionality, of network node 200_a_, 200_b_ are omitted in order not to obscure the concepts presented herein.

Figure 9:
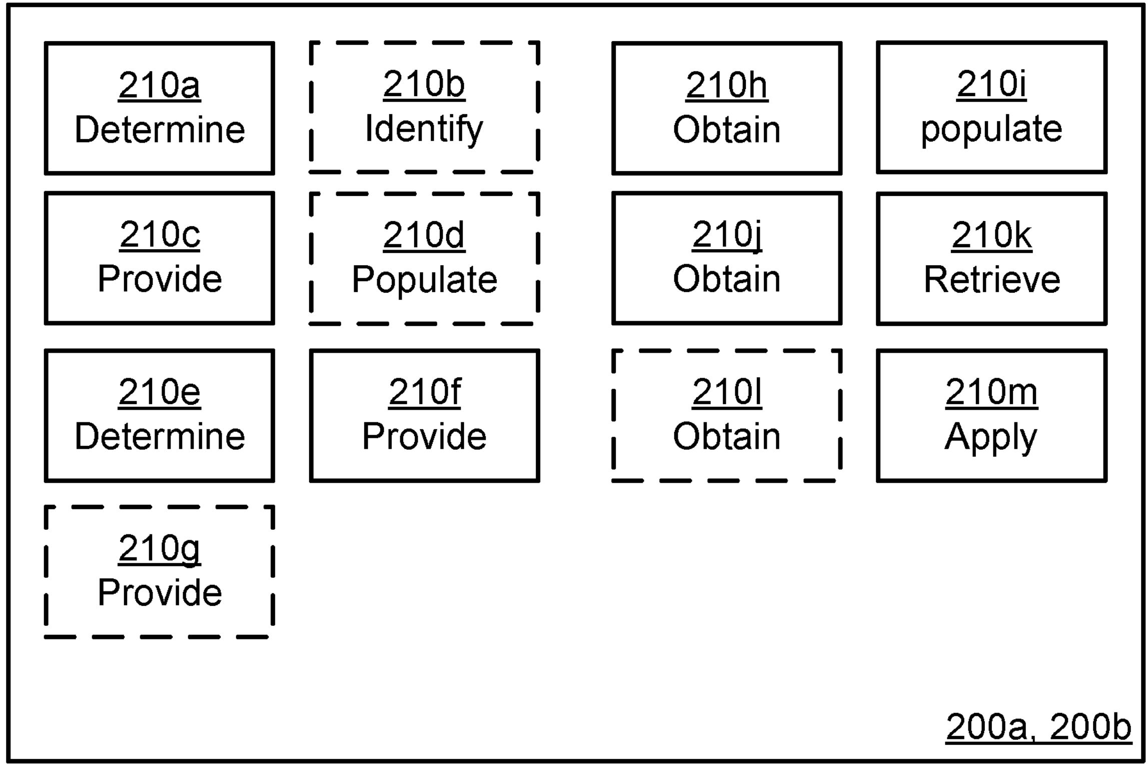
FIG. 9 is a schematic diagram showing functional modules of a network node according to an embodiment.

FIG. 9 schematically illustrates, in terms of a number of functional modules, the components of network node 200_a_, 200_b_ according to an embodiment. Network node 200_a_, 200_b_ of FIG. 9 comprises a number of functional modules.

In order to function as a serving network node 200_a_, network node 200_a_, 200_b_ comprises a determine module 210_a_ configured to perform step S102, a provide module 210_c_ configured to perform step S106, a determine module 210_e_ configured to perform step S110, and a provide module 210_f_ configured to perform step S112. In order to further function as a serving network node 200_a_, network node 200_a_, 200_b_ comprises further comprise a number of optional functional modules, such as any of an identify module 210_b_ configured to perform step S104, a populate module 210_d_ configured to perform step S108, and a provide module 210_g_ configured to perform step S114.

In order to function as a neighbor network node 200_b_, network node 200_a_, 200_b_ comprises an obtain module 210_h_ configured to perform step S202, a populate module 210_i_ configured to perform step S204, an obtain module 210_j_ configured to perform step S206, a retrieve module 210_k_ configured to perform step S208, and an apply module 210_m_ configured to perform step S212. In order to further function as a serving network node 200_a_, network node 200_a_, 200_b_ comprises further comprise a number of optional functional modules, such as an obtain module 210_l_ configured to perform step S210.

In general terms, each functional module 210_a_: 210_m_ may be implemented in hardware or in software. Preferably, one or more or all functional modules 210_a_: 210_m_ may be implemented by the processing circuitry 210, possibly in cooperation with the communications interface 220 and/or the storage medium 230. The processing circuitry 210 may thus be arranged to from the storage medium 230 fetch instructions as provided by a functional module 210_a_: 210_m_ and to execute these instructions, thereby performing any steps of network node 200*a*, 200*b* as disclosed herein.

Each network node 200*a*, 200*b* may be provided as a standalone device or be part of at least one further device. For example, network node 200*a*, 200*b* may be provided in a node of the radio access network or in a node of the core network. Alternatively, functionality of network node 200*a*, 200*b* may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. Thus, a first portion of the instructions performed by network node 200*a*, 200*b* may be executed in a first device, and a second portion of the instructions performed by network node 200*a*, 200*b* may be executed in a second device; the herein disclosed embodiments are not limited to any particular number of devices on which the instructions performed by network node 200*a*, 200*b* may be executed. Hence, the methods according to the herein disclosed embodiments are suitable to be performed by a network node 200*a*, 200*b* residing in a cloud computational environment. Therefore, although a single processing circuitry 210 is illustrated in FIG. 8 the processing circuitry 210 may be distributed among a plurality of devices, or nodes. The same applies to the functional modules 210*a*: 210*m* of FIG. 9 and the computer programs 1020*a*, 1020*b* of FIG. 10.

Figure 10:
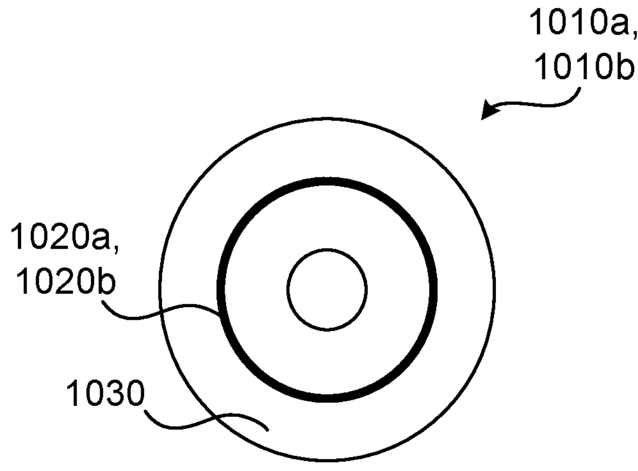
FIG. 10 shows one example of a computer program product comprising computer readable means according to an embodiment.

FIG. 10 shows one example of a computer program product 1010*a*, 1010*b* comprising computer readable means 1030. On this computer readable means 1030, a computer program 1020*a* can be stored, which computer program 1020*a* can cause the processing circuitry 210 and thereto operatively coupled entities and devices, such as the communications interface 220 and the storage medium 230, to execute methods according to embodiments described herein. The computer program 1020*a* and/or computer program product 1010*a* may thus provide means for performing any steps of network node 200*a* as herein disclosed. On this computer readable means 1030, a computer program 1020*b* can be stored, which computer program 1020*b* can cause the processing circuitry 210 and thereto operatively coupled entities and devices, such as the communications interface 220 and the storage medium 230, to execute methods according to embodiments described herein. The computer program 1020*b* and/or computer program product 1010*b* may thus provide means for performing any steps of network node 200*b* as herein disclosed.

In the example of FIG. 10, the computer program product 1010*a*, 1010*b* is illustrated as an optical disc, such as a CD (compact disc) or a DVD (digital versatile disc) or a Blu-Ray disc. The computer program product 1010*a*, 1010*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020*a*, 1020*b* is here schematically shown as a track on the depicted optical disk, the computer program 1020*a*, 1020*b* can be stored in any way which is suitable for the computer program product 1010*a*, 1010*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for interference suppression in a wireless communication network, the method being performed by a network node, the method comprising:

determining that uplink sounding is to be performed for a first user equipment served by the network node and located at a location; providing a notification to a neighbor network node and the first user equipment to participate in the uplink sounding of the first user equipment;

determining to perform a downlink transmission towards a second user equipment served by the network node and located at the location; and providing an indication for interference suppression at the location to the neighbor network node before performing the downlink transmission, wherein the indication is based on spatial channel characteristics determined from the uplink sounding of the first user equipment, and wherein the spatial channel characteristics represent radio conditions for the location, wherein the network node participates in the uplink sounding of the first user equipment, and wherein the method further comprises: populating a database with the spatial channel characteristics.

2. The method according to claim 1, wherein the location corresponds to a cell edge of the network node, and/or has been identified as impacted by interference.

3. The method according to claim 1, wherein the notification provided to the first user equipment comprises instructions for the first user equipment to transmit uplink reference signals as part of participating in the uplink sounding of the first user equipment.

4. The method according to claim 3, wherein the instructions identify uplink reference signal resources for the first user equipment to use when transmitting the uplink reference signals.

5. The method according to claim 1, wherein which uplink reference signal resources for the first user equipment to use is coordinately determined with the neighbor network node.

6. The method according to claim 1, wherein the uplink sounding is performed only when a traffic load of the network node is below a traffic load threshold value and/or during a predetermined time interval.

7. The method according to claim 1, wherein the uplink sounding is performed only when at most a predetermined amount of previous uplink sounding has been performed for the location or when at least a predetermined amount of time has passed since a recent-most previous uplink sounding for the location was performed.

8. The method according to claim 1, wherein the method further comprises: identifying the neighbor network node as a candidate for causing interference at the location before providing the notification to the neighbor network node.

9. The method according to claim 8, wherein the neighbor network node is identified based on at least one of: historical information regarding previously caused interference at the location, a measurement report from the first user equipment, distance information regarding physical distance between the network node and the neighbor network node, network topology information.

10. The method according to claim 1, wherein the spatial channel characteristics are represented by covariance information.

11. The method according to claim 10, wherein the covariance information is frequency dependent.

12. The method according to claim 1, wherein the indication for interference suppression is provided in response to the network node having determined that the second user equipment is located at the location.

13. The method according to claim 1, wherein the method further comprises: providing information to the neighbor network node regarding time, frequency, and/or code, resources to be used by the network node when performing the downlink transmission.

14. The method according to claim 1, wherein the location is represented by either a direction value and a distance value, or a set of coordinates, or an index.

15. The method according to claim 1, wherein the first user equipment and the second user equipment are either different from each other or are one and the same user equipment.

16. A method for interference suppression in a wireless communication network, the method being performed by a network node, the method comprising:

obtaining a notification from a neighbor network node to participate in uplink sounding of a user equipment served by the neighbor network node;

populating a database with spatial channel characteristics, wherein the spatial channel characteristics are determined from measurements on an uplink reference signal received by the network node from the user equipment as part of the uplink sounding, and wherein the spatial channel characteristics represent radio conditions for a location at which the user equipment is located when transmitting the uplink reference signal;

obtaining, from the neighbor network node, an indication for interference suppression at the location; retrieving, from the database, the spatial channel characteristics for the location and as populated in the database by the network node; and applying a precoder determined based on the spatial channel characteristics when performing a downlink transmission for interference suppression towards the location.

17. A network node for interference suppression in a wireless communication network, the network node comprising processing circuitry, the processing circuitry being configured to cause the network node to:

determine that uplink sounding is to be performed for a first user equipment served by the network node and located at a location; provide a notification to a neighbor network node and the first user equipment to participate in the uplink sounding of the first user equipment;

determine to perform a downlink transmission towards a second user equipment served by the network node and located at the location; and provide an indication for interference suppression at the location to the neighbor network node before performing the downlink transmission, wherein the indication is based on spatial channel characteristics determined from the uplink sounding of the first user equipment, and wherein the spatial channel characteristics represent radio conditions for the location, wherein the network node participates in the uplink sounding of the first user equipment, and wherein the processing circuitry is further configured to cause the network node to populate a database with the spatial channel characteristics.

18. The network node according to claim 17, wherein the notification provided to the first user equipment comprises instructions for the first user equipment to transmit uplink reference signals as part of participating in the uplink sounding of the first user equipment.

19. A network node for interference suppression in a wireless communication network, the network node comprising processing circuitry, the processing circuitry being configured to cause the network node to:

obtain a notification from a neighbor network node to participate in uplink sounding of a user equipment served by the neighbor network node;

populate a database with spatial channel characteristics, wherein the spatial channel characteristics are determined from measurements on an uplink reference signal received by the network node from the user equipment as part of the uplink sounding, and wherein the spatial channel characteristics represent radio conditions for a location at which the user equipment is located when transmitting the uplink reference signal;

obtain, from the neighbor network node, an indication for interference suppression at the location; retrieve, from the database, the spatial channel characteristics for the location and as populated in the database by the network node; and apply a precoder determined based on the spatial channel characteristics when performing a downlink transmission for interference suppression towards the location.

* * * * *